(12) United States Patent
Ouriev

(10) Patent No.: US 7,044,435 B2
(45) Date of Patent: May 16, 2006

(54) SYSTEM FOR INFLUENCING THE RHEOLOGICAL PROPERTIES OF A TRANSPORTABLE MATERIAL

(75) Inventor: Boris Ouriev, Niederuzwil (CH)

(73) Assignee: Buehler AG, Uzwil (CH)

( * ) Notice: Subject to any disclaimer, the term of this patent is extended or adjusted under 35 U.S.C. 154(b) by 0 days.

(21) Appl. No.: 10/501,622

(22) PCT Filed: Jan. 20, 2003

(86) PCT No.: PCT/CH03/00033

§ 371 (c)(1),
(2), (4) Date: Oct. 13, 2004

(87) PCT Pub. No.: WO03/059794

PCT Pub. Date: Jul. 24, 2003

(65) Prior Publication Data

US 2005/0072947 A1    Apr. 7, 2005

(30) Foreign Application Priority Data

Jan. 21, 2002   (DE) ............................... 102 02 248

(51) Int. Cl.
*B65G 53/52*   (2006.01)
(52) U.S. Cl. .................................................. 251/124
(58) Field of Classification Search ................. 251/124
See application file for complete search history.

(56) References Cited

U.S. PATENT DOCUMENTS

| | | | | |
|---|---|---|---|---|
| 2,869,358 A | * | 1/1959 | Heisig ........................ 73/54.34 |
| 3,176,964 A | * | 4/1965 | Cottell et al. ................ 366/119 |
| 3,499,456 A | * | 3/1970 | Petry et al. .................. 134/151 |
| 4,750,523 A | * | 6/1988 | Crouse .......................... 138/30 |
| 4,856,344 A | | 8/1989 | Hunt | |
| 5,123,433 A | | 6/1992 | Fridsma et al. | |
| 5,241,991 A | * | 9/1993 | Iorio et al. ................... 137/807 |
| 5,690,145 A | * | 11/1997 | Kuklinski et al. .......... 137/828 |
| 5,785,815 A | * | 7/1998 | Munch ........................ 162/198 |
| 5,996,630 A | * | 12/1999 | Ruffa .......................... 137/828 |
| 5,998,681 A | | 12/1999 | Rojey | |
| 6,186,176 B1 | * | 2/2001 | Gelbmann ................... 137/807 |
| 6,432,160 B1 | * | 8/2002 | Norville et al. ............... 75/333 |
| 2002/0117214 A1 | * | 8/2002 | Tucker et al. ............ 137/487.5 |

FOREIGN PATENT DOCUMENTS

| | | |
|---|---|---|
| GB | 2 085 388 | 4/1982 |
| JP | 60-36223 | 2/1985 |

* cited by examiner

*Primary Examiner*—J. Casimer Jacyna
(74) *Attorney, Agent, or Firm*—Jordan and Hamburg LLP

(57) ABSTRACT

A system for influencing the rheological properties of a transportable material, especially a free-flowing, pasty or bulk product is associated, or can be associated, with a machine for processing or treating the transportable material in which the transportable material is transported in a transport direction. The system includes at least one controllable operative system for producing mechanical oscillations and applying the same to the material in at least one processing section of the machine, and at least one detection system for detecting the rheological properties of the material. The detected rheological properties are used as a basis for controlling the operative system for producing the mechanical oscillations and applying the same.

10 Claims, 3 Drawing Sheets

SYSTEM FOR INFLUENCING THE RHEOLOGICAL PROPERTIES OF A TRANSPORTABLE MATERIAL

BACKGROUND OF THE INVENTION

This invention relates to a system for influencing the rheological properties of a conveyable material, in particular a pourable or pasty product or a loose material, wherein the system is or can be allocated to a machine for machining or processing the conveyable material, in which the conveyable material is transported along a conveying direction.

A lot of energy and in part correspondingly large machines are required for the transport and machining/processing of viscous or pasty masses, but also for the transport of loose material. In addition, wall friction during the transport of such masses or loose material gives rise to varying retention times of the material in machine areas or in transport lines, which detracts from the quality of the machined/processed material achieved in the end.

U.S. Pat. No. 5,123,433 describes an ultrasound cleaning device and an ultrasound cleaning method for a Venturi flow nozzle, through which streams a fluid that tends to form deposits. Both a US transmitter and US receiver are additionally used, wherein the clues as to the thickness of potential deposits in the nozzle can be gleaned from changes in the received US amplitude at a known transmitted US amplitude. Other than acquiring the state of contamination of the nozzle based on deposits, however, no rheological properties of the streaming fluid are acquired.

SUMMARY OF THE INVENTION

Therefore, the object of the invention is to effect a savings relative to energy and/or machine size during the machining/processing and primarily the transport of viscous or pasty materials in the machine on the one hand, and make it possible to monitor and evaluate the rheological properties of the masses in the machine.

This object is achieved according to the invention with a system mentioned at the outset having the at least one controllable impact system for generating and introducing mechanical oscillations in the material in at least one machining section of the machine, along with at least one acquisition system for acquiring the rheological properties of the material, wherein the acquired rheological properties are used as the basis for actuating the impact system for generating and introducing the mechanical oscillations.

Acquiring the effects of exposure to the at least one controllable impact system on the rheological properties of the material by means of the at least one acquisition system makes it possible to specifically influence the rheological properties in at least one machining area of the machine.

According to the invention, the acquisition system preferably has a first means for determining the velocity field transverse to the conveying direction in an area of the material, and a second means for determining the pressure difference along the conveying direction in the area and/or at the edge of the area of the material, or the acquisition system again has a means for determining the velocity field transverse to the conveying direction in an area of the material, and a second means for determining the shearing stress along the conveying direction at the edge and/or inside the area of the material.

The shearing viscosity function of the material can be determined when the velocity field of the material and the pressure difference present on the material is known, both when using the pressure difference and when using the shearing stress. This noninvasive procedure is particularly well suited for industrial processes.

The system according to the invention can have several impact systems for mechanical oscillations, wherein at least one impact system for mechanical oscillations can be actuated independently of the operating status. Even several impact systems for mechanical oscillations can be actuated separately from each other. This makes it possible to specifically influence the material to be processed, machined or transported, if necessary in a varying manner at different machining sections of the machine.

In a particularly advantageous embodiment of the system according to the invention, a first acquisition system for acquiring the rheological properties of the conveyable material is arranged downstream from the machining section in order to generate first signals, which characterize the physicochemical, in particular rheological properties of the material downstream from the machining section. This makes it possible to continuously monitor the effectiveness of influencing the material in the machining section, and hence adjust the intensity of influence exerted as required.

It is best to additionally arrange a second acquisition system for acquiring the rheological properties of the conveyable material upstream from the machining section in order to generate second signals, which characterize the physicochemical, in particular rheological properties of the material upstream from the machining section.

The first and second acquisition system now make it possible to compare the first signals and/or the second signals with respective reference values, which characterize specific rheological properties, wherein feedback takes place within a control circuit as a function of the result from comparing the signals to activate the at least one impact system for mechanical oscillations.

Additionally or alternatively, the first signals and second signals can also be compared with each other, wherein feedback here also takes place within a control circuit as a function of the result from comparing the signals to activate the at least one impact system for mechanical oscillations.

Additional advantages, features and possible applications of the invention will now be presented in the following description of exemplary embodiments of the invention, which are not to be construed as limiting

DESCRIPTION OF THE PREFERRED EMBODIMENTS

Figure 1:
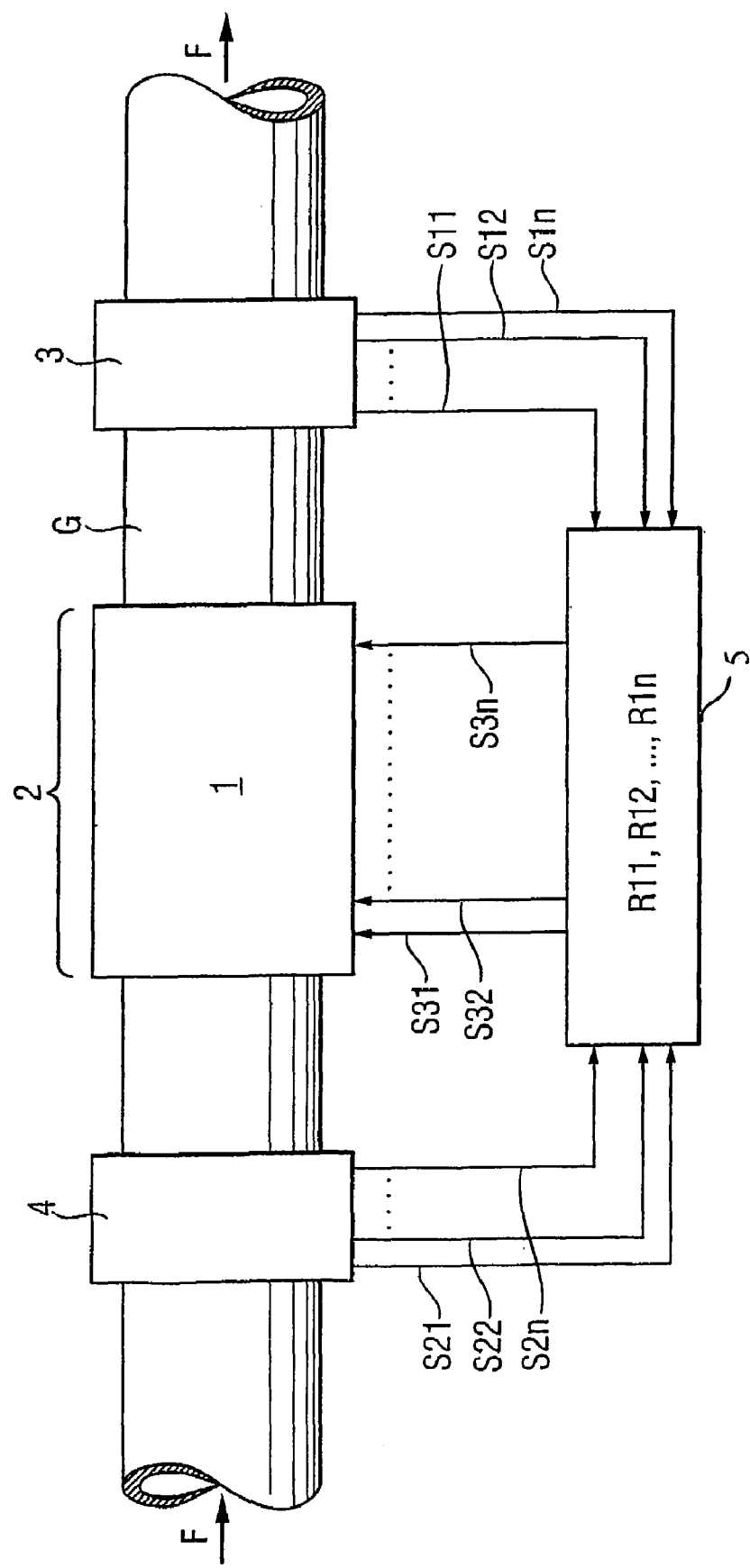
FIG. 1 is a diagrammatic view of the system according to the invention, block diagram.

FIG. 1 is a diagrammatic view of the system according to the invention as a block diagram. A conveyable material whose rheological properties are influenced by the system according to the invention flows through a machine section with a casing section G in conveying direction F. To this end, a controllable impact system 1 is allocated to the casing section G of the machine section in the area of a machining section 2 of the machine. A first acquisition system 3 and a second acquisition system 4 are allocated to the casing section G downstream and upstream from the processing section (2) of the machine. The first and second acquisition system 3, 4 are used to acquire the rheological properties of the conveyable material downstream and upstream from the machining section 2. The first acquisition system 3 is used to generate first signals S11, S12, . . . S1n, which characterize the physicochemical, in particular rheological properties of the material downstream from the machining section 2. The second acquisition system 4 is used to generate second signals S21, S22, . . . S2n, which characterize the physicochemical, in particular rheological properties of the material upstream from the machining section 2.

The first signals S11, S12, . . . , S1n originating from the first acquisition system 3 are routed to a closed-loop or open-loop control circuit 5. In like manner, the second signals S21, S2, . . . , S2n originating from the second acquisition system 4 are routed to the closed-loop or open-loop control circuit 5. The first and second signals originating from the first acquisition system 3 and the second acquisition system 4 are processed in this closed-loop or open-loop control circuit 5. While processing these signals, for example, the first signals S11, S12, . . . , S1n and/or second signals S21, S22, . . . , S2n are compared with respective reference values R11, R12, . . . , R1n. In addition or as an alternative, the first signals and second signals can also be compared to each other. As a function of the comparison of the first and second signals to the reference values and the first signals to the second signals, the closed-loop or open-loop control circuit 5 effects an actuation (S31, S32, . . . , S3n) of the of the impact system 1, in which the mechanical oscillations necessary for influencing the rheological properties of the conveyable material are generated.

Figure 2:
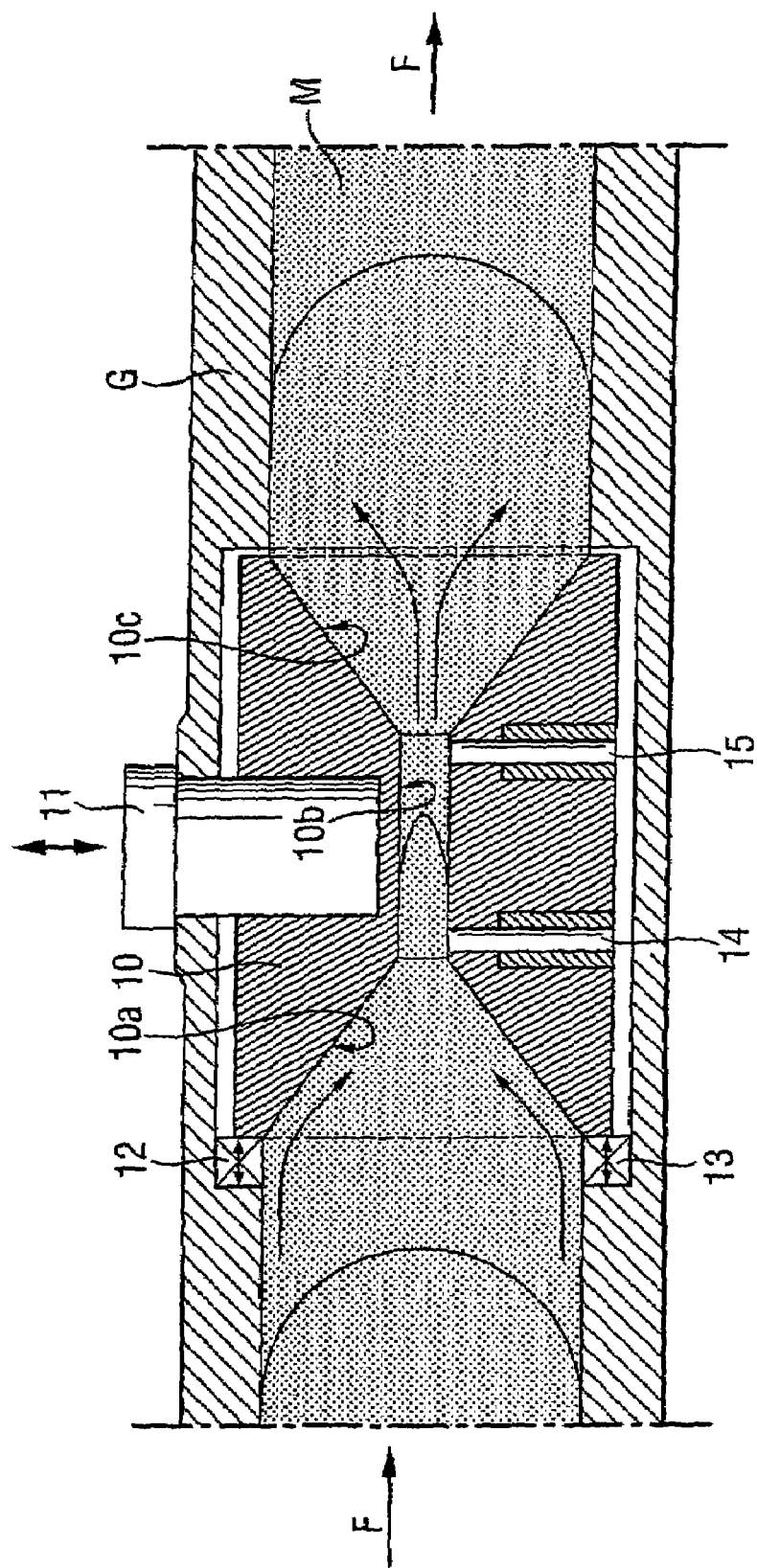
FIG. 2 is a diagrammatic view of a special embodiment of the controllable impact system, longitudinal section along the material conveying direction.

FIG. 2 is a diagrammatic view of a special embodiment of the controllable impact system in a longitudinal section along the material conveying direction F. A slit die 10 is arranged in the casing section G. Along the flowing direction F, the passage area of the slit die 10 consists of a tapering inlet area 10a, which abuts a slit area 10b, which in turn empties out in an expanding outlet area 10c. The slit die also contains a first ultrasound source 11, and is connected with a second and third ultrasound source 12, 13. The first ultrasound source 11 is used to introduce a high-intensity ultrasound wave in the slit area 10b, wherein the oscillating direction is predominantly perpendicular to the flowing direction F. The second and third ultrasound source 12, 13 are also used to introduce ultrasound waves in the area of the slit die 10, wherein the oscillating direction runs predominantly parallel to the flowing direction F. A first pressure sensor 14 and second pressure sensor 15 are located at the upstream and downstream end of the slit area 10b. The pressure difference between the first pressure sensor 14 and second pressure sensor 15 determined in this way can be used in conjunction with information about the volumetric flow through the casing section G to determine the shearing viscosity of the conveyable material M.

Figure 3:
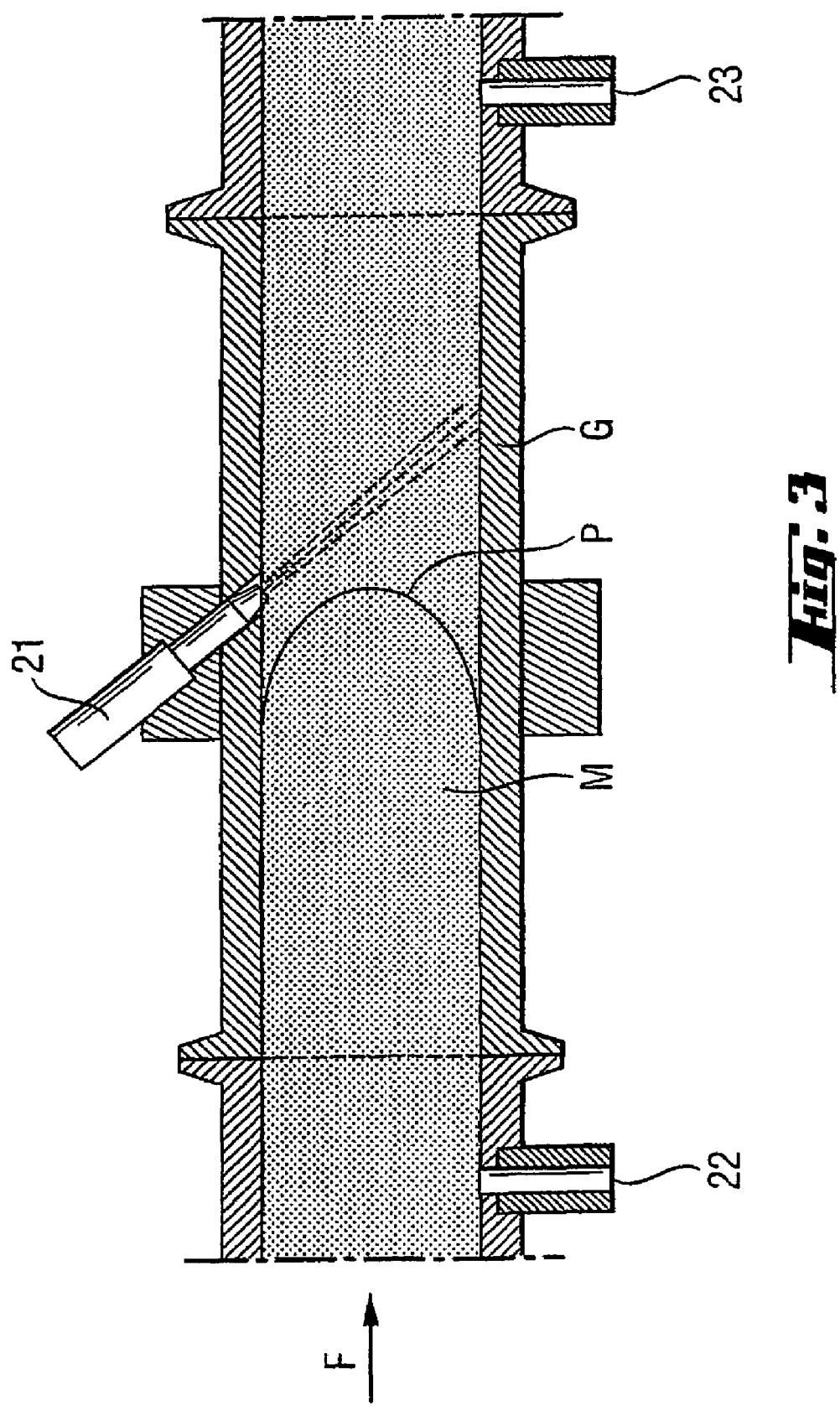
FIG. 3 is a diagrammatic view of a special embodiment of the acquisition system, longitudinal section along the material conveying direction.

FIG. 3 is a diagrammatic view of a special embodiment of the acquisition system in a longitudinal section through the material conveying direction F. An ultrasound transmitter/receiver 21 determines the velocity profile P or velocity of flowing material M from the echo of the ultrasound as a function of the radial coordinate. A first pressure sensor 22 upstream from the ultrasound transmitter/receiver and a second pressure sensor 23 downstream from the ultrasound transmitter/receiver make it possible to determine a pressure difference along the casing wall G, and hence to determine the wall tension. Assuming a linear shearing stress distribution in the tubular cross section, this makes it possible to determine the shearing viscosity as a function of the local velocity gradient along with the also determined velocity profile P.

REFERENCE SYMBOL LIST

1 Impact system
2 Machining section
3 First acquisition system
4 Second acquisition system
5 Closed-loop or open-loop control circuit
10 Slit die
11 First ultrasound source
12 Second ultrasound source
13 Third ultrasound source
14 First pressure sensor
15 Second pressure sensor
10a Inlet area
10b Slit area
10c Outlet area
F Conveying direction
G Casing section
P Velocity profile
M Material
S11 to S1n First signals
S21 to S2n Second signals
R11 to R1n Reference values
21 Ultrasound transmitter/receiver
22 First pressure sensor
23 Second pressure sensor.

The invention claimed is:

1. A system for influencing the rheological properties of a conveyable material, wherein the system is or can be allocated to a machine for machining or processing the conveyable material, in which the conveyable material is transported along a conveying direction the system comprising:
   a) at least one controllable impact system for generating and introducing mechanical oscillations in the material in at least one machining section of the machine, along with
   b) at least one acquisition system for acquiring the rheological properties of the material; wherein
   c) the acquired rheological properties are used as the basis for actuating the impact system for generating and introducing the mechanical oscillations,
   d) the acquisition system has a first means for determining the velocity field transverse to the conveying direction in an area of the material, and a second means for determining the pressure difference along the conveying direction in the area and/or at the edge of the area of the material.

2. A system for influencing the rheological properties of a conveyable material, wherein the system is or can be allocated to a machine for machining or processing the conveyable material, in which the conveyable material is transported along a conveying direction, the system comprising:
   a) at least one controllable impact system for generating and introducing mechanical oscillations in the material in at least one machining section of the machine, along with b) at least one acquisition system for acquiring the rheological properties of the material; wherein
c) the acquired rheological properties are used as the basis for actuating the impact system for generating and introducing the mechanical oscillations,
d) the acquisition system has a first means for determining the velocity field transverse to the conveying direction in an area of the material, and a second means for determining the shearing stress along the conveying direction at the edge of or inside the area of the material.

3. The system according to claims 1 or 2, wherein several impact systems for mechanical oscillations are provided.

4. The system according to claims 1 or 2, wherein at least one impact system for mechanical oscillations can be actuated independently of the operating status of the machine.

5. The system according to claims 1 or 2, wherein several impact systems for mechanical oscillations can be actuated separately from each other.

6. The system according to claims 1 or 2, wherein a first acquisition system for acquiring the rheological properties of the conveyable material is arranged downstream from the machining section in order to generate first signals, which characterize the physicochemical, in particular rheological properties of the material downstream from the machining section.

7. The system according to claim 6, wherein a second acquisition system for acquiring the rheological properties of the conveyable material is arranged upstream from the machining section in order to generate second signals, which characterize the physicochemical, in particular rheological properties of the material upstream from the machining section.

8. A machine according to claim 7, wherein the first signals and/or the second signals are compared with respective reference values, which characterize specific rheological properties, wherein feedback takes place within a control circuit as a function of the result from comparing the signals to activate the at least one impact system for mechanical oscillations.

9. A machine according to claim 7, wherein the first signals and/or the second signals are compared with each other, wherein feedback takes place within a control circuit as a function of the result from comparing the signals to activate the at least one impact system for mechanical oscillations.

10. A system according to claim 1 or 2, wherein the conveyable material comprises a pourable material, a pasty powder or a loose material.

\* \* \* \* \*